United States Patent
Singh et al.

(10) Patent No.: US 10,735,282 B1
(45) Date of Patent: Aug. 4, 2020

(54) APPARATUS, SYSTEM, AND METHOD FOR DEBUGGING NETWORK DEVICES BASED ON THE CONTENTS OF DROPPED PACKETS

(71) Applicant: Juniper Networks, Inc., Sunnyvale, CA (US)

(72) Inventors: Prashant Singh, Santa Clara, CA (US); Sreekanth Rupavatharam, Campbell, CA (US); Erin C. MacNeil, Carp (CA)

(73) Assignee: Juniper Networks, Inc, Sunnyvale, CA (US)

( * ) Notice: Subject to any disclaimer, the term of this patent is extended or adjusted under 35 U.S.C. 154(b) by 0 days.

(21) Appl. No.: 16/024,496

(22) Filed: Jun. 29, 2018

(51) Int. Cl.
  *H04L 12/26* (2006.01)
  *H04L 29/06* (2006.01)
  *H04L 12/24* (2006.01)
  *H04L 12/823* (2013.01)

(52) U.S. Cl.
  CPC ........ *H04L 43/028* (2013.01); *H04L 41/0654* (2013.01); *H04L 41/0677* (2013.01); *H04L 63/1425* (2013.01); *H04L 63/1441* (2013.01); *H04L 69/22* (2013.01); *H04L 47/32* (2013.01)

(58) Field of Classification Search
  CPC .................................................. H04L 43/028
  See application file for complete search history.

(56) References Cited

U.S. PATENT DOCUMENTS

| | | | |
|---|---|---|---|
| 2005/0076287 A1* | 4/2005 | Mantong | H04L 29/06 714/758 |
| 2016/0294566 A1* | 10/2016 | Pan | H04L 12/04 |
| 2017/0054659 A1* | 2/2017 | Ergin | H04L 67/1097 |
| 2017/0149639 A1* | 5/2017 | Vasseur | H04L 43/0835 |
| 2017/0318038 A1* | 11/2017 | Shehory | H04L 63/1416 |

OTHER PUBLICATIONS

Network Interface; https://en.wikipedia.org/wiki/Network_interface (Jan. 11, 2004).
Pcap; https://en.wikipedia.org/wiki/Pcap (Dec. 15, 2005).
Tcpdump; https://en.wikipedia.org/wiki/Tcpdump (May 14, 2004).

* cited by examiner

*Primary Examiner* — Kevin M Cunningham
(74) *Attorney, Agent, or Firm* — FisherBroyles, LLP

(57) ABSTRACT

A disclosed method may include (1) detecting, at a network stack of a network device, a packet that (A) is destined at least intermediately for a network interface of the network device and (B) has been flagged by the network stack to be dropped instead of forwarded to the network interface based on at least one characteristic of the packet, (2) instead of dropping the packet, forwarding the packet to an alternative network interface of the network device that analyzes content of packets, (3) identifying, at the alternative network interface, the characteristic of the packet, and then (4) executing, based on the characteristic of the packet, at least one action in connection with the packet that improves the performance of the network device. Various other apparatuses, systems, and methods are also disclosed.

20 Claims, 8 Drawing Sheets

US 10,735,282 B1

APPARATUS, SYSTEM, AND METHOD FOR DEBUGGING NETWORK DEVICES BASED ON THE CONTENTS OF DROPPED PACKETS

BACKGROUND

Inspecting the content of dropped packets often aids network administrators and information technology (IT) personnel in debugging network issues. For example, by identifying a missing or incorrect field within a packet's header, an administrator may be able to determine that a particular network device or connection is malfunctioning. In addition, inspecting the content of packets that have been dropped due to a packet filter rule may enable network security personnel to detect and track security threats.

Traditional technologies for analyzing dropped packets may involve capturing and/or printing the content (e.g., header fields, payload, etc.) of each packet that is received at a network interface. These traditional technologies may then parse this content to identify packets that are to be dropped. Unfortunately, capturing the content of each packet that is received at a network interface may be time-consuming and/or resource-intensive. For example, a conventional packet analysis system may implement and/or require different logic and/or tools for each type of packet received at a network interface. This problem may be exacerbated during heavy network loads.

The instant disclosure, therefore, identifies and addresses a need for additional and improved apparatuses, systems, and methods for debugging network devices based on the contents of dropped packets.

SUMMARY

As will be described in greater detail below, the instant disclosure generally relates to apparatuses, systems, and methods for debugging network devices based on the contents of dropped packets. In one example, a method for accomplishing such a task may include (1) detecting, at a network stack of a network device, a packet that (A) is destined at least intermediately for a network interface of the network device and (B) has been flagged by the network stack to be dropped instead of forwarded to the network interface based on at least one characteristic of the packet, (2) instead of dropping the packet, forwarding the packet to an alternative network interface of the network device that analyzes content of packets, (3) identifying, at the alternative network interface, the characteristic of the packet, and then (4) executing, based on the characteristic of the packet, at least one action in connection with the packet that improves the performance of the network device.

Similarly, a system that implements the above-described method may include various modules stored in memory and at least one physical processor that executes those modules. For example, such a system may include (1) a detection module that detects, at a network stack of a network device, a packet that (A) is destined at least intermediately for a network interface of the network device and (B) has been flagged by the network stack to be dropped instead of forwarded to the network interface based on at least one characteristic of the packet, (2) a forwarding module that instead of dropping the packet, forwards the packet to an alternative network interface of the network device that analyzes content of packets, (3) an identification module that identifies, at the alternative network interface, the characteristic of the packet, and (4) an action module that executes, based on the characteristic of the packet, at least one action in connection with the packet that improves the performance of the network device.

As a further example, an apparatus for implementing the above-described method may include at least one storage device that stores rules for identifying packets to be dropped at a network device. The apparatus may also include at least one physical processing device communicatively coupled to the storage device, wherein the physical processing device (1) detects, at a network stack of the network device, a packet that (A) is destined at least intermediately for a network interface of the network device and (B) has been flagged by the network stack to be dropped instead of forwarded to the network interface based on at least one characteristic of the packet, (2) instead of dropping the packet, forwards the packet to an alternative network interface of the network device that analyzes content of packets, (3) identifies, at the alternative network interface, the characteristic of the packet, and then (4) executes, based on the characteristic of the packet, at least one action in connection with the packet that improves the performance of the network device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
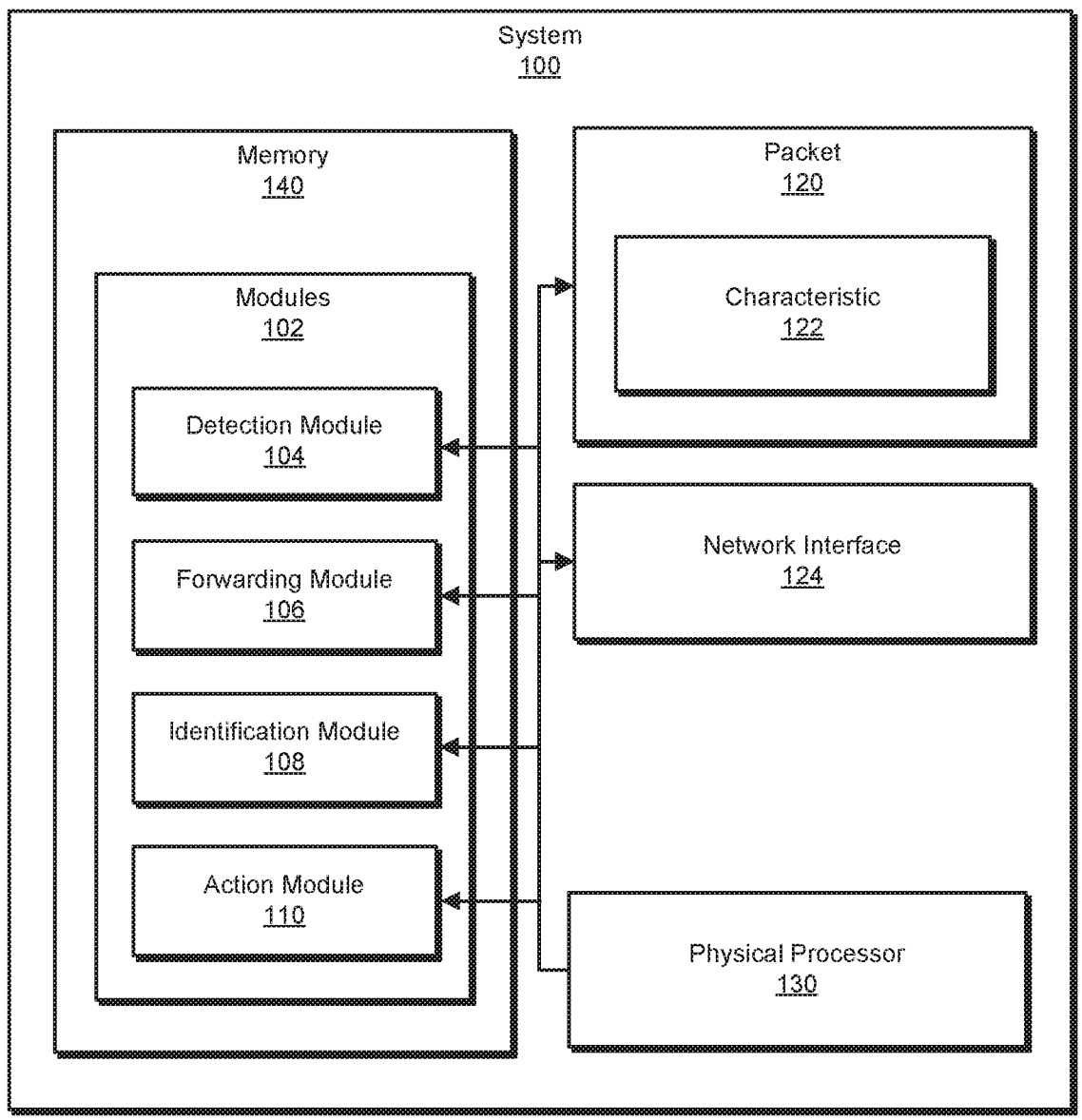
FIG. 1 is a block diagram of an exemplary system for debugging network devices based on the contents of dropped packets.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for debugging network devices based on the contents of dropped packets. The term "dropped packet," as used herein, generally refers to any packet that a network device (e.g., a network stack of a network device) discards and/or deletes instead of forwards to an intended destination (e.g., network address) of the packet. In some examples, a network device may mark, label, or otherwise flag a packet to be dropped. Network devices may drop packets for a variety of reasons, such as due to the packets satisfying criteria of packet filter rules and/or due to the packets containing errors that render the packets undeliverable. Inspecting the content of packets that have been flagged to be dropped may provide network administrators with valuable insight into malfunctions and/or security threats within networks.

As will be explained in greater detail below, embodiments of the instant disclosure may detect that a network stack of a network device has flagged a packet to be dropped. In response to detecting the flagged packet, embodiments of the instant disclosure may reroute and/or redirect the packet to an alternative network interface (i.e., a network interface other than the interface to which the packet was originally destined). This alternative network interface may represent a virtual interface that is dedicated to receiving and analyzing dropped packets.

By forwarding dropped packets to such an alternative network interface, embodiments of the instant disclosure may facilitate efficient retrieval and analysis of the content of these packets. For example, because this alternative network interface may contain and/or store only packets that have been flagged to be dropped, embodiments of the instant disclosure may avoid analyzing the contents of packets that have not been flagged. Because the majority of packets received at a network device are generally not dropped, embodiments of the instant disclosure may greatly reduce the time and computing resources consumed by traditional packet analysis systems (which may involve capturing and/or printing the content of each packet received at a network interface). Furthermore, embodiments of the instant disclosure may capture the contents of packets via commands executed in the user space of a network device. By doing so, these embodiments may avoid executing inefficient and/or resource-intensive commands in the kernel of a network device (as may be performed by traditional packet analysis systems).

Embodiments of the instant disclosure may further facilitate efficient analysis of dropped packets by inserting, into a flagged packet before forwarding the packet to an alternative network interface, an indication of why the packet was flagged. For example, embodiments of the instant disclosure may insert an error code into the header of the packet. Once the flagged packet arrives at the alternative network interface, this error code may enable the disclosed packet analysis systems to quickly identify (and then resolve) the network issue that compromised the packet. In addition, embodiments of the instant disclosure may scramble and/or corrupt one or more header fields (such as a checksum field) of flagged packets before forwarding the packets to the alternative network interface, thereby preventing the packets from being inadvertently forwarded to their intended destination by a network stack.

Figure 2:
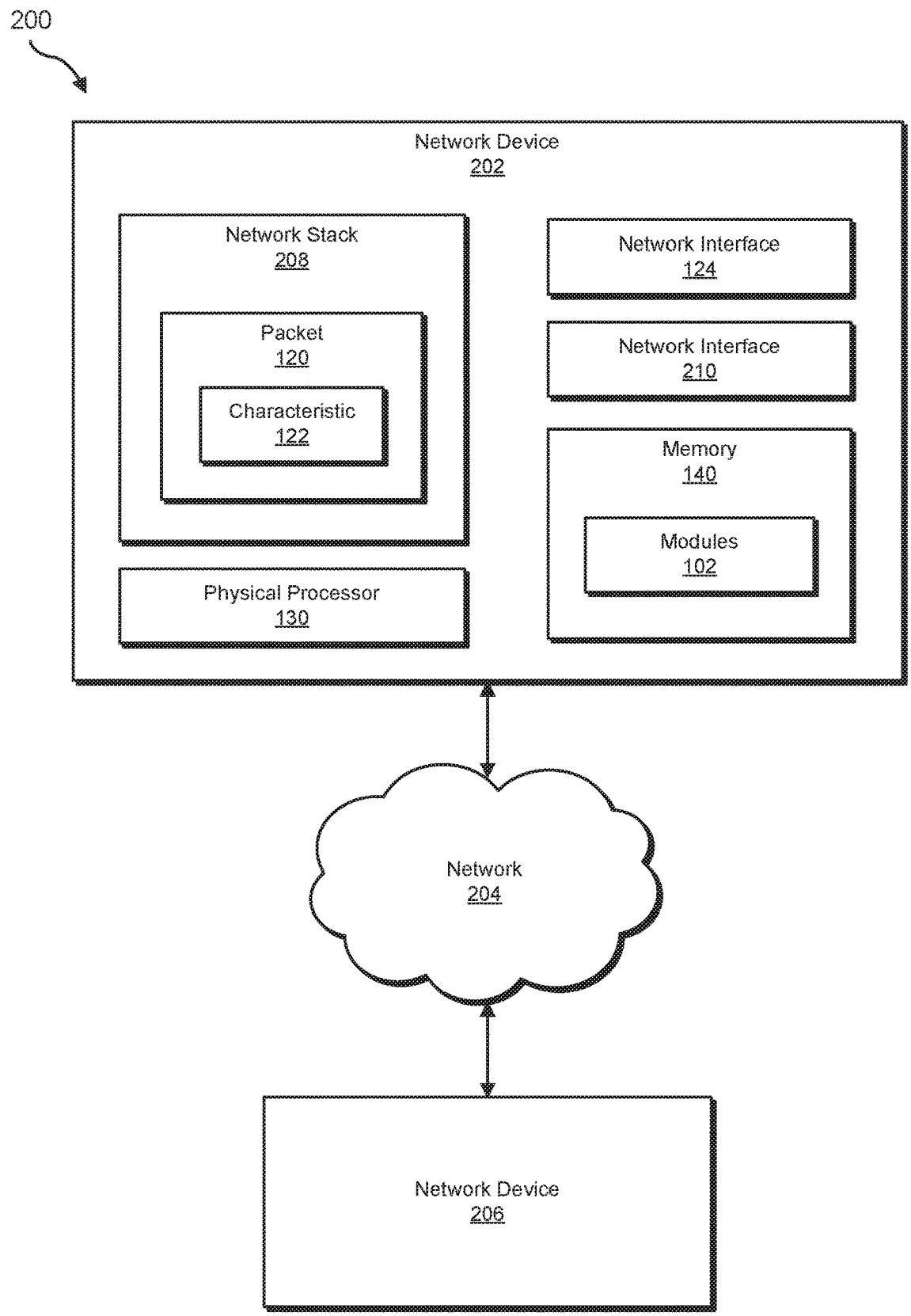
FIG. 2 is a block diagram of an additional exemplary system for debugging network devices based on the contents of dropped packets.
Figure 5:
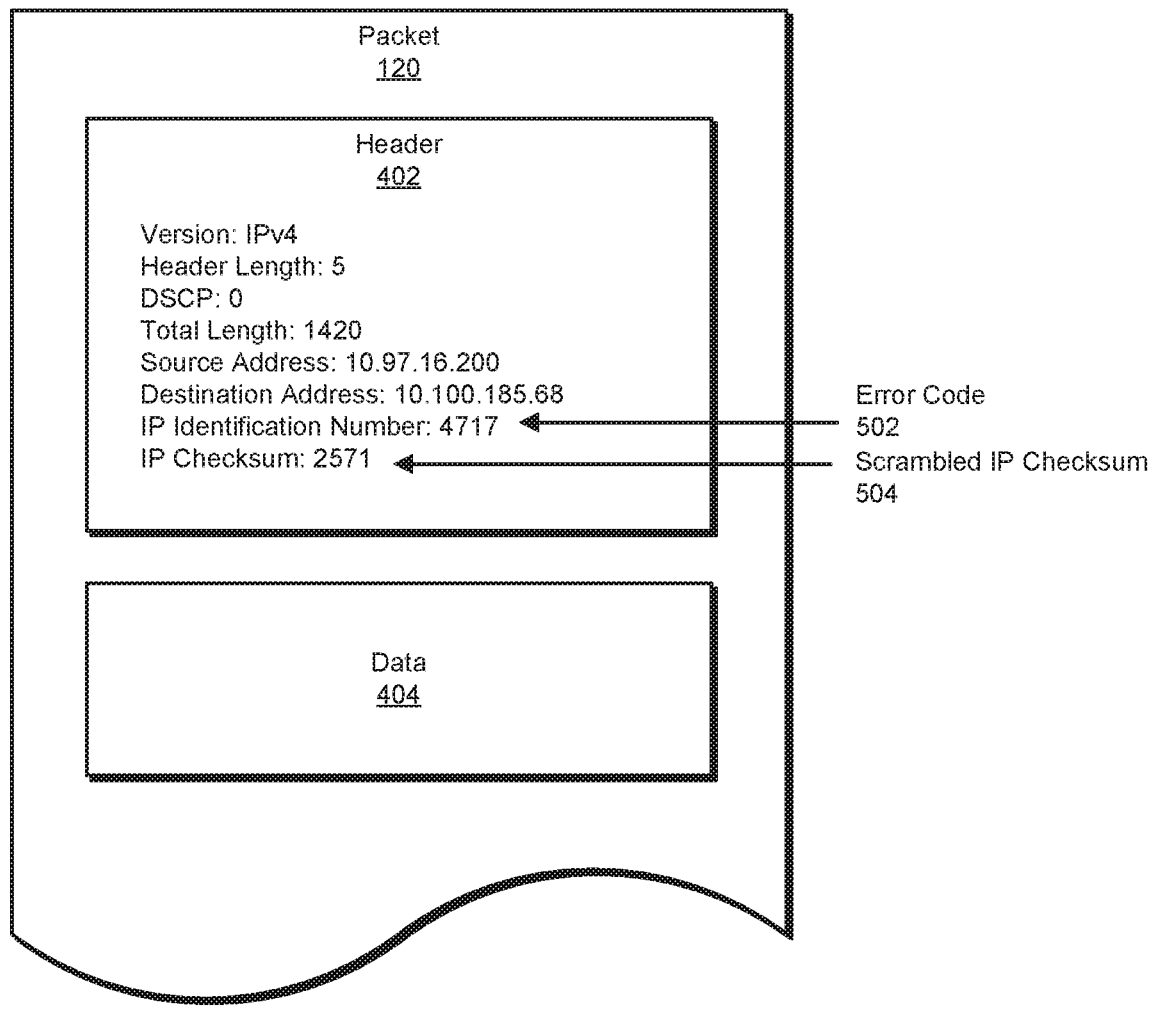
FIG. 5 is an illustration of an additional exemplary packet received at a network device.
Figure 6:
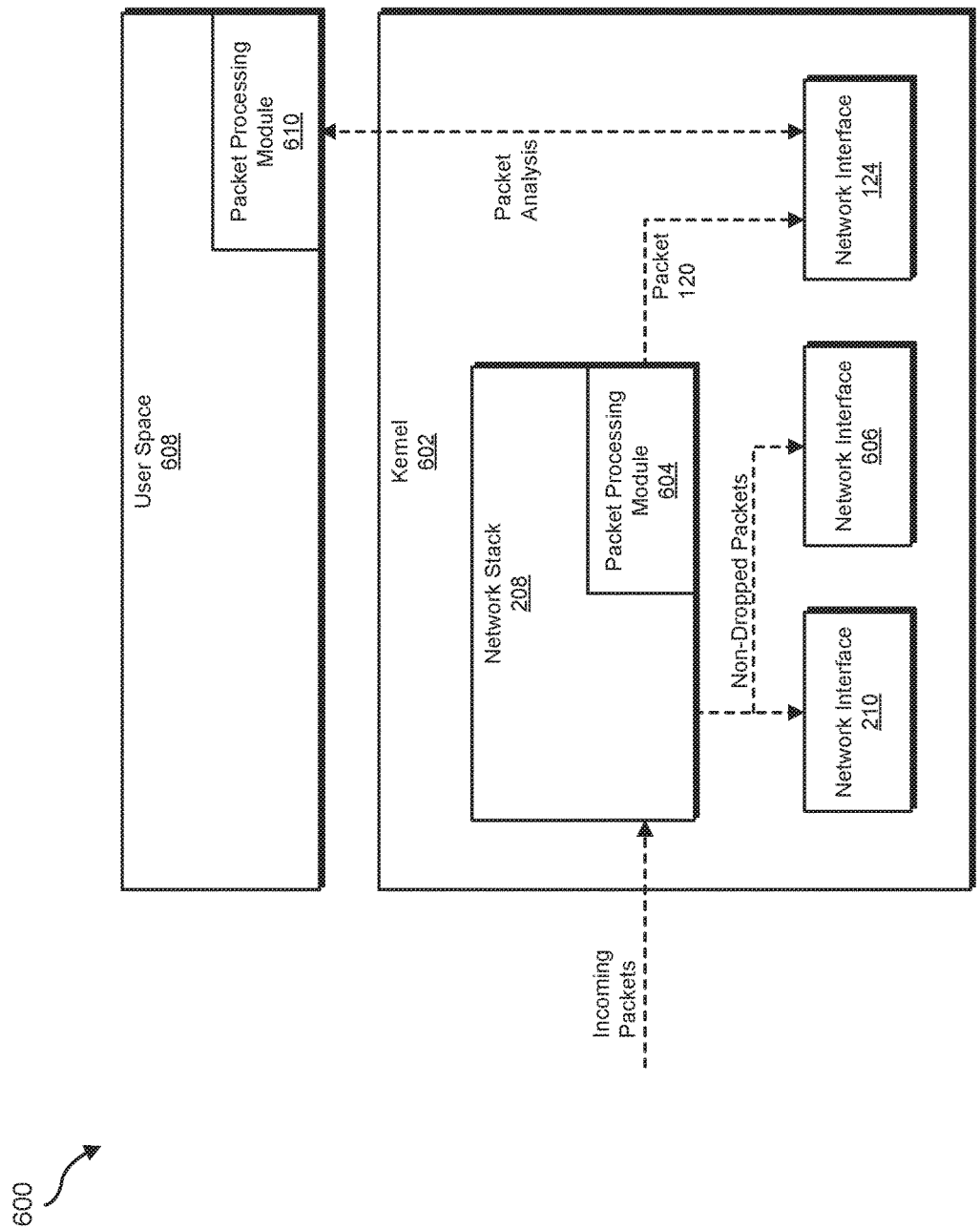
FIG. 6 is a block diagram of an additional exemplary system for debugging network devices based on the contents of dropped packets.

The following will provide, with reference to FIGS. 1, 2, and 6, detailed descriptions of exemplary systems for debugging network devices based on the contents of dropped packets. Detailed descriptions of corresponding computer-implemented methods will be provided in connection with FIGS. 3 and 7. In addition, detailed descriptions of exemplary packets received at network devices will be provided in connection with FIGS. 4 and 5. Finally, detailed descriptions of an exemplary computing system for carrying out these methods will be provided in connection with FIG. 8.

FIG. 1 shows an exemplary system 100 that facilitates debugging network devices based on the contents of dropped packets. As illustrated in FIG. 1, system 100 may include one or more modules 102 for performing one or more tasks. As will be explained in greater detail below, modules 102 may include a detection module 104, a forwarding module 106, an identification module 108, and an action module 110. Although illustrated as separate elements, one or more of modules 102 in FIG. 1 may represent portions of a single module or application (such as an operating system, a packet filtering tool, and/or a network debug tool).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network device 202 and/or network device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate debugging network devices based on the contents of dropped packets. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more packets, such as a packet 120. The term "packet," as used herein, generally refers to any unit of formatted data that is distributed and/or transferred over a network connection. Packet 120 may represent and/or include any type or form of packet. For example, packet 120 may be distributed via any type of network protocol (such as Internet Protocol (IP) protocols, Hypertext Transfer Protocol (HTTP) protocols, Bluetooth protocols, cellular network protocols, etc.). In addition, packet 120 may be of any suitable and/or standard size and/or format.

In some examples, the disclosed packet analysis systems may receive packet 120 at a network device while packet 120 is traversing a network route (e.g., after packet 120 has been forwarded by one or more additional network devices). As will be explained in greater detail below, after receiving packet 120, the disclosed packet analysis systems may determine that the network device that received packet 120 has flagged packet 120 to be dropped instead of forwarded to an intended destination of packet 120. For example, the disclosed packet analysis systems may identify one or more characteristics of packet 120 (such as a characteristic 122 illustrated in FIG. 1) that correspond to and/or satisfy at least one rule and/or set of criteria used by the network device to flag packets to be dropped.

Characteristic 122 generally represents any type or form of property, feature, attribute, and/or component of packet 120 that indicates at least in part whether packet 120 is capable of being accurately and/or safely forwarded to the intended destination of packet 120. For example, characteristic 122 may indicate that packet 120 contains an error (e.g., a missing or corrupted portion of data) that prevents a network device from forwarding and/or processing packet 120. Additionally or alternatively, characteristic 122 may indicate that packet 120 potentially contains and/or represents a security threat.

After identifying characteristic 122 of packet 120, the disclosed packet analysis systems may forward packet 120 to a particular network interface (such as a network interface 124 shown in FIG. 1) for analysis. The term "network interface," as used herein, generally refers to any connection and/or link between a computing device and a network. In one example, a network interface may include and/or represent a physical point of connection (e.g., a network interface card). In other examples, a network interface may represent a virtual interface (e.g., a network interface implemented solely or predominantly in software).

In one embodiment, network interface 124 may represent a network interface that is at least partially dedicated to identifying and analyzing the contents of packets that have been flagged to be dropped. For example, network interface 124 may represent a virtual network interface that the disclosed packet analysis systems create for the purpose of analyzing flagged packets. In other examples, network interface 124 may represent an existing network interface within a network device that the disclosed packet analysis systems have allocated and/or dedicated to analyzing flagged packets.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 202 in communication with a network device 206 via a network 204. In one example, all or a portion of the functionality of modules 102 may be performed by network device 202, network device 206, and/or any other suitable computing system. For example, and as will be described in greater detail below, one or more of modules 102 from FIG. 1 may, when executed by at least one processor of network device 202 and/or network device 206 in FIG. 2, enable network device 202 and/or network device 206 to analyze content of dropped packets.

For example, and as will be described in greater detail below, one or more of modules 102 may cause network device 202 to (1) detect, at a network stack 208 of network device 202, packet 120 that (A) is destined at least intermediately for a network interface 210 of network device 202 and (B) has been flagged by network stack 208 to be dropped instead of forwarded to network interface 210 based at least on characteristic 122 of packet 120, (2) instead of dropping packet 120, forward packet 120 to network interface 124 of network device 202, (3) identify characteristic 122 of packet 120 at network interface 124, and then (4) execute, based on characteristic 122 of packet 120, at least one action in connection with packet 120 that improves the performance of network device 202.

Network devices 202 and 206 each generally represent any type or form of physical computing device capable of reading computer-executable instructions and/or handling network traffic. In one example, network devices 202 and 206 may each include and/or represent a router (such as a provider edge router, hub router, spoke router, autonomous system boundary router, and/or area border router) that receives, routes, forwards, and/or otherwise handles network traffic. Additional examples of network devices 202 and 206 include, without limitation, switches, hubs, modems, bridges, repeaters, gateways, multiplexers, network adapters, network interfaces, laptops, tablets, desktops, servers, cellular phones, Personal Digital Assistants (PDAs), multimedia players, embedded systems, wearable devices, gaming consoles, variations or combinations of one or more of the same, and/or any other suitable network devices.

Network 204 generally represents any medium or architecture capable of facilitating communication or data transfer. In one example, network 204 may facilitate communication between network device 202 and network device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to network 204 in FIG. 2, network devices 202 and 206 may each represent a portion of network 204 and/or be included in network 204.

As illustrated in FIG. 2, network device 202 may include network interface 124 and network interface 210. Network interface 210 generally represents any type or form of network interface implemented and/or managed by network device 202. In one embodiment, network interface 210 may represent a network interface to which packet 120 is addressed and/or destined at least intermediately. As shown in FIG. 2, network device 202 may also include network stack 208. In some examples, network stack 208 may include and/or represent a set of protocol layers. Specifically, these protocol layers may include at least a portion of the Open Systems Interconnection (OSI) protocol suite. Examples of such protocol layers include, without limitation, layer 1—physical layer, layer 2—data link layer, layer 3—network layer, layer 4—transport layer, layer 5—session layer, layer 6—presentation layer, layer 7—application layer, variations or combinations of one or more of the same, and/or any other suitable protocol layers. In one embodiment, all or a portion of modules 102 may be implemented within and/or as part of network stack 208.

Figure 3:
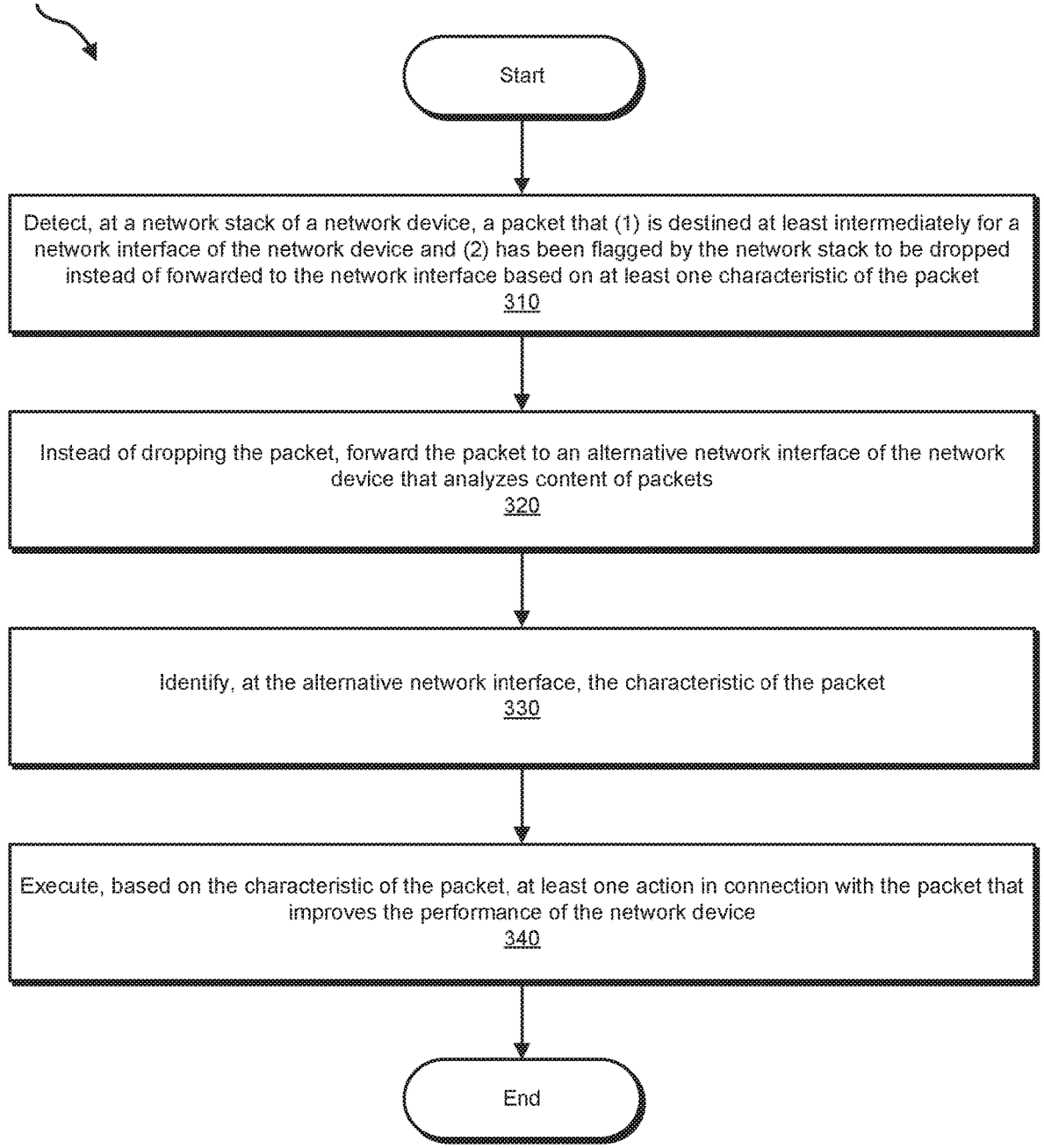
FIG. 3 is a flow diagram of an exemplary method for debugging network devices based on the contents of dropped packets.

FIG. 3 is a flow diagram of an exemplary computer-implemented method 300 for debugging network devices based on the contents of dropped packets. The steps shown in FIG. 3 may be performed by any suitable computer-executable code and/or computing system, including system 100 in FIG. 1, system 200 in FIG. 2, system 600 in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may detect, at a network stack of a network device, a packet that (A) is destined at least intermediately for a network interface of the network device and (B) has been flagged by the network stack to be dropped instead of forwarded to the network interface based on at least one characteristic of the packet. For example, detection module 104 may, as part of network device 202 in FIG. 2, detect packet 120 at network stack 208 of network device 202. In this example, packet 120 may be (1) destined at least intermediately for network interface 210 of network device 202 and (2) be flagged by network stack 208 to be dropped instead of forwarded to network interface 210 based at least in part on characteristic 122 of packet 120. In one example, detection module 104 may perform this step while operating as part of and/or in conjunction with network stack 208.

The systems described herein may perform step 310 in a variety of ways and/or contexts. In some examples, detection module 104 may determine that network stack 208 flags certain incoming packets to be dropped instead of forwarded to their intended destinations. For example, a packet filter within network stack 208 may compare characteristics of incoming packets with a set of rules and/or criteria used to identify packets that should be dropped. These rules and/or criteria may identify packets with a variety of characteristics, such as packets with errors (e.g., errors that prevent proper and/or efficient processing of the packets) and/or packets with malicious properties. In response to detecting a packet whose characteristics satisfy one or more of these rules and/or criteria, network stack 208 may flag the packet to be dropped. Network stack 208 may flag a packet to be dropped in a variety of ways, such as by altering one or more fields within a header of the packet and/or removing the packet from a processing stack or queue.

In some embodiments, detection module 104 may detect packet 120 while monitoring packets that have been flagged to be dropped by network stack 208. In response to determining that network stack 208 has flagged packet 120 to be dropped, detection module 104 may determine that packet 120 should be sent to a certain network interface (e.g., network interface 124) for analysis, rather than being dropped or further processed by network stack 208. In other words, detection module 104 may intercept packet 120 before network stack 208 drops packet 120.

In other embodiments, detection module 104 may perform all or a portion of the analysis to determine whether packet 120 should be flagged to be dropped. For example, detection module 104 may directly receive incoming packets at network stack 208 and then compare characteristics of the packets with a set of rules and/or criteria used to identify packets to be dropped. In other words, detection module 104 may operate as and/or assume the role of a packet filter that identifies packets to be dropped. In these embodiments, detection module 104 may identify characteristic 122 within packet 120 and then determine, based on characteristic 122, that packet 120 should be forwarded to network interface 124 for analysis.

In some examples, detection module 104 may alter and/or modify one or more portions of data within packet 120 after determining that packet 120 is to be forwarded to network interface 124. For example, detection module 104 may add, to packet 120, an indication and/or description of characteristic 122. In particular, detection module 104 may add an error code to a field within a header of packet 120. For example, detection module 104 may maintain a list of error codes that correspond to and/or indicate various characteristics of packets that are flagged to be dropped. After identifying characteristic 122 within packet 120, detection module 104 may identify an error code within this list that corresponds to and/or indicates characteristic 122. Detection module 104 may then add this error code to a certain (e.g., pre-selected) location of the header of packet 120. As will be explained in greater detail below, one or more of modules 102 may identify and/or analyze this indication of characteristic 122 after packet 120 is forwarded to network interface 124.

Additionally or alternatively, detection module 104 may alter one or more portions of data within packet 120 to ensure that packet 120 is not further processed by network stack 208 (e.g., forwarded to the intended destination of packet 120). For example, detection module 104 may scramble, change, delete, and/or otherwise corrupt data within a checksum field of a header of packet 120. Because the data in a checksum field may be used by network stacks, network interfaces, and/or other network device subsystems to verify and/or authenticate a packet, corrupting the data in this field may render the packet undeliverable (i.e., incapable of being forwarded). By corrupting the data within a checksum field of packet 120, detection module 104 may prevent packet 120 from being forwarded to any network interface other than network interface 124.

Figure 4:
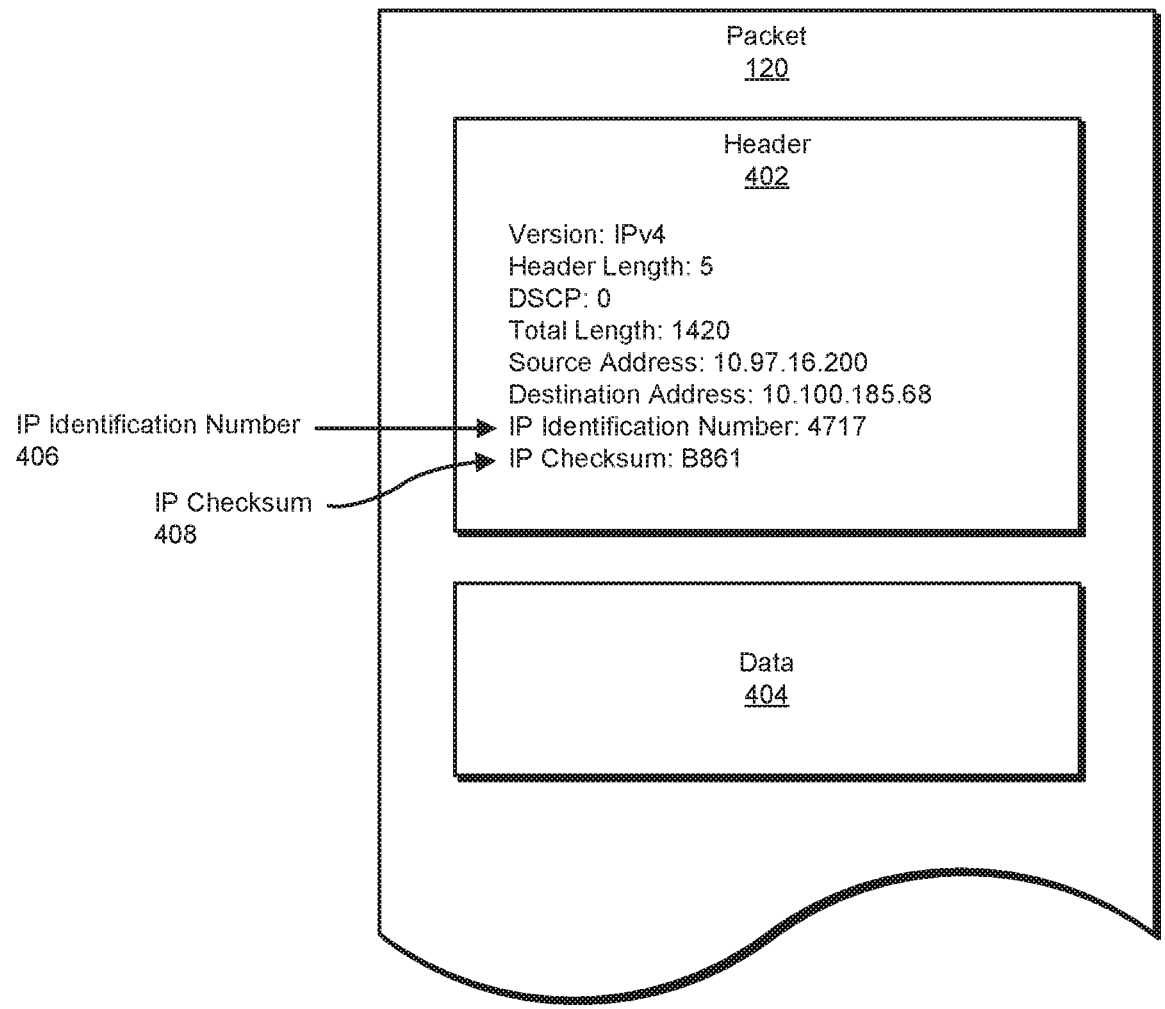
FIG. 4 is an illustration of an exemplary packet received at a network device.

FIG. 4 illustrates an exemplary embodiment of packet 120. In this example, packet 120 may include a header 402 and data 404. Header 402 generally represents any type or form of packet header, such as a User Datagram Protocol (UDP) header and/or a Transmission Control Protocol (TCP) header. As shown in FIG. 4, header 402 may contain a variety of information that facilitates handling and/or routing packet 120, including a network protocol used to forward packet 120, a length of header 402, a differentiated services code point (DSCP) value of packet 120, a total length of packet 120, a source IP address of packet 120, and/or a destination IP address of packet 120. In addition, header 402 may include an IP identification number 406 (in this example, "4717") and an IP checksum 408 (in this example, "B861") of packet 120. Header 402 may include any additional information about packet 120 not illustrated in FIG. 4. In some examples, packet 120 may also include additional headers and/or portions of data. Detection module 104 and/or a packet filter within network stack 208 may identify characteristic 122 within any of the headers and/or portions of data of packet 120.

FIG. 5 illustrates an exemplary embodiment of packet 120 after detection module 104 has altered one or more fields within header 402. In this example, detection module 104 may replace (e.g., overwrite) IP identification number 406 with an error code 502. In one embodiment, error code 502 (i.e., "4717") may correspond to and/or indicate characteristic 122 of packet 120. Detection module 104 may insert error code 502 into header 402 in any additional or alternative manner.

In addition, detection module 104 may replace IP checksum 408 with a scrambled IP checksum 504. In some embodiments, detection module 104 may create scrambled IP checksum 504 (i.e., "2571") by removing, switching, and/or otherwise changing one or more bits of IP checksum 408. Alternatively, detection module 104 may create scrambled IP checksum 504 by generating a random number whose length (e.g., 16 bits) matches the length of IP checksum 408. In some embodiments, replacing IP checksum 408 with scrambled IP checksum 504 may prevent subsystems (other than network interface 124) within network device 202 from processing packet 120. Detection module 104 may also alter and/or corrupt any additional portion data within packet 120 to prevent this processing.

Returning to FIG. 3, at step 320 one or more of the systems described herein may, instead of dropping the packet, forward the packet to an alternative network interface of the network device that analyzes content of packets. For example, forwarding module 106 may, as part of network device 202 in FIG. 2, forward packet 120 to network interface 124 instead of dropping packet 120. In one example, forwarding module 106 may perform this step while operating as part of and/or in conjunction with network stack 208 of network device 202.

The systems described herein may perform step 320 in a variety of ways and/or contexts. In some examples, forwarding module 106 may create and/or establish network interface 124 within network device 202. For example, as mentioned above, network interface 124 may represent and/or include a virtual network interface. In this example, forwarding module 106 may allocate a portion of the hardware and/or software resources of network device 202 to operate as network interface 124. In other examples, forwarding module 106 may select and/or designate an existing (e.g., hardware-based) network interface within network device 202 to operate as network interface 124. In some embodiments, forwarding module 106 may establish and/or create network interface 124 prior to identifying packets that have been flagged to be dropped.

FIG. 6 illustrates a system 600 that describes an exemplary implementation of network interface 124 within network device 202. In this example, network interface 124 may reside and/or operate within a kernel 602 of network device 202. Kernel 602 generally represents any type or form of processing unit and/or module within the operating system of network device 202. In some examples, kernel 602 may receive, process, and/or forward all or a portion of the packets directed to network device 202. In the example of FIG. 6, kernel 602 may be separated and/or operate independently from a user space 608 of network device 202. User space 608 generally represents a portion of the software and/or hardware resources of network device 202 that a user of network device 202 is capable of accessing and/or managing. In some embodiments, components of kernel 602 may interact and/or communicate with components of user space 608 via various commands, instructions, and/or interfaces.

As shown in FIG. 6, kernel 602 may include various network interfaces in addition to network interface 124. For example, kernel 602 may include network interface 210 (e.g., the intended destination of packet 120) and a network interface 606 (e.g., an additional network interface that handles packets that are not flagged to be dropped).

As also shown in FIG. 6, kernel 602 may include network stack 208. In one example, network stack 208 may contain and/or operate a packet processing module 604. In system 600, packet processing module 604 may include one or more of modules 102, such as detection module 104 and forwarding module 106. In some examples, a packet processing module 610 within user space 608 may also include one or more of modules 102. In one embodiment, packet processing module 610 may include identification module 108 and action module 110 (e.g., the modules not included within packet processing module 604).

In some examples, detection module 104 may identify and process packet 120 as part of packet processing module 604. After detection module 104 processes packet 120 (e.g., alters one or more fields of a header of packet 120), forwarding module 106 (also implemented within packet processing module 604) may forward packet 120 to network interface 124. For example, instead of forwarding packet 120 to network interface 210 or discarding, deleting, and/or otherwise dropping packet 120, forwarding module 106 may redirect packet 120 to network interface 124. Forwarding module 106 may forward packet 120 to network interface 124 in any suitable manner, such as by readdressing packet 120 and/or transmitting packet 120 via an application program interface (API) or similar mechanism.

In some embodiments, packet processing module 604 and/or network stack 208 may detect one or more packets that are not to be dropped. For example, detection module 104 may identify packets that do not contain any characteristics that indicate the packets should be dropped. Detection module 104 may therefore determine that these packets should be forwarded to their intended destination. In system 600, network stack 208 may forward these packets to network interfaces 210 and/or 606. These network interfaces may then process, handle, and/or forward the packets normally (e.g., in accordance with the intended and/or original network paths of the packets).

Returning to FIG. 3, at step 330 one or more of the systems described herein may identify the characteristic of the packet at the alternative network interface. For example, identification module 108 may, as part of network device 202 in FIGS. 2 and/or 6, identify characteristic 122 of packet 120 at network interface 124. In one example, identification module 108 may perform this step while operating as part of and/or in conjunction with packet processing module 610 within system 600 in FIG. 6.

The systems described herein may perform step 330 in a variety of ways and/or contexts. In some examples, identification module 108 may identify all or a portion of the content of packet 120 while packet 120 is held and/or stored at network interface 124. The term "content of a packet," as used herein, generally refers to all or a portion of the headers, payload, and/or additional data stored within a packet. In one embodiment, identification module 108 may identify the content of packet 120 by executing one or more packet-retrieval commands, such as a "tcpdump" command or a packet capture (e.g., "pcap") command. In some examples, such commands may be executed via a command line of network device 202. Additionally or alternatively, these commands may be implemented via an interface mechanism that is capable of filtering packets, such as a Berkeley Packet Filter (BPF) or similar tool.

In system 600, identification module 108 may perform a command to identify the content of packet 120 while operating as part of packet processing module 610 within user space 608. This command may be initiated by a user (e.g., a network administrator) and/or autonomously (e.g., identification module 108 may be programmed to perform such commands automatically). Notably, executing such commands via modules running in user space 608 may enable the disclosed packet analysis systems to identify the contents of packets more quickly and/or efficiently than traditional packet analysis systems. For example, conventional technologies for analyzing dropped packets may retrieve the content of a packet via a print command executed within the kernel of a network device. Such commands may generally consume greater computing resources than "tcpdump" commands or similar commands executed within the user space of a network device.

In some embodiments, identification module 108 may execute a command to identify the content of each packet that is currently held and/or stored at network interface 124. For example, identification module 108 may execute a general "tcpdump" command that returns the entirety of each packet at network interface 124. In other embodiments, identification module 108 may selectively retrieve the content of a portion of the packets at network interface 124. For example, identification module 108 may execute a command to identify the packet that most recently arrived at network interface 124 (e.g., packet 120). In another example, identification module 108 may execute a command to identify packets at network interface 124 that match certain criteria, such as packets directed to a particular port or packets originating from a particular network device. In some examples, selectively retrieving the content of particular packets may enable the disclosed systems to efficiently identify specific network errors and/or security threats. In addition, selectively retrieving the content of particular packets may reduce the workload of the disclosed packet analysis systems.

After identifying the content of packet 120, identification module 108 may perform a variety of analyses on the content. In one embodiment, identification module 108 may identify characteristic 122 within packet 120. For example, identification module 108 may identify error code 502 within header 402 of packet 120 (illustrated in FIG. 5). Because detection module 104 may have inserted error code 502 into header 402 based on characteristic 122, identification module 108 may determine characteristic 122 based on error code 502. In other words, identification module 108 may infer the reason that packet 120 was flagged to be dropped based on error code 502.

In one embodiment, identification module 108 may determine that packet 120 was flagged to be dropped due to a network error (e.g., a malfunction within a network device or network system involved in routing and/or forwarding packet 120). In this embodiment, Identification module 108 may also identify a particular device, interface, connection, port, etc. that produced the error.

Additionally or alternatively, identification module 108 may determine that packet 120 was flagged to be dropped due to packet 120 satisfying one or more packet filter rules implemented at network device 202. For example, identification module 108 may determine that characteristic 122 corresponds to a characteristic of packets known to be malicious, such as packets associated with network attacks and/or network infiltrations. In another example, identification module 108 may determine that characteristic 122 indicates packet 120 is likely to contain spam or other unwanted content.

In some embodiments, identification module 108 may extract error codes and/or characteristics from multiple packets that were forwarded to network interface 124. In these embodiments, identification module 108 may compare the extracted error codes and/or characteristics to identify patterns or trends of dropped packets within certain network devices, ports, connections, routes, etc.

As mentioned above, detection module 104 may modify one or more portions of data (e.g., a checksum field) within packet 120 to ensure that packet 120 is not fully processed by network stack 208. In some examples, identification module 108 may further ensure that packet 120 is not processed by network stack 208 (or another subsystem within network device 202) by prompting network interface 124 to drop or discard packet 120 after identification module 108 has retrieved and/or analyzed the content of packet 120. For example, identification module 108 may configure and/or implement a network filter rule that instructs network interface 124 to drop packets forwarded to network interface 124 (e.g., after a certain amount of time and/or after the packets have been analyzed by identification module 108).

Returning to FIG. 3, at step 340 one or more of the systems described herein may execute, based on the characteristic of the packet, at least one action in connection with the packet that improves the performance of the network device. For example, action module 110 may, as part of network device 202 in FIGS. 2 and/or 6, execute at least one action in connection with packet 120 that improves the performance of network device 202. This action may be determined from and/or based on characteristic 122 of packet 120. In one example, action module 110 may perform this step while operating as part of and/or in conjunction with packet processing module 604 and/or packet processing module 610 of system 600 in FIG. 6.

The systems described herein may perform step 340 in a variety of ways and/or contexts. As mentioned above, in some examples, identification module 108 may determine that packet 120 represents a security threat. In these examples, action module 110 may perform any suitable action to protect network device 202 from malicious behavior potentially exhibited by packet 120. For example, action module 110 may increase security protocols within network device 202 and/or provide packet 120 to a security service for further analysis. Additionally or alternatively, action module 110 may drop and/or quarantine packet 120. As also mentioned above, in other examples, identification module 108 may determine that packet 120 was flagged to be dropped based on packet 120 containing a network error. In these examples, action module 110 may take any suitable action to correct the network error, such as resetting or refreshing a network connection, routing packets via an alternative port or interface, and/or reconfiguring settings of network device 202.

In some embodiments, action module 110 may provide characteristic 122, error code 502, and/or any additional characteristic of packet 120 to a user or administrator of network device 202. For example, action module 110 may output the results of the analysis performed by identification module 108 during step 330 to an administrator. In this way, action module 110 may enable the administrator to appropriately record and/or respond to the network issues identified in the analysis.

Figure 7:
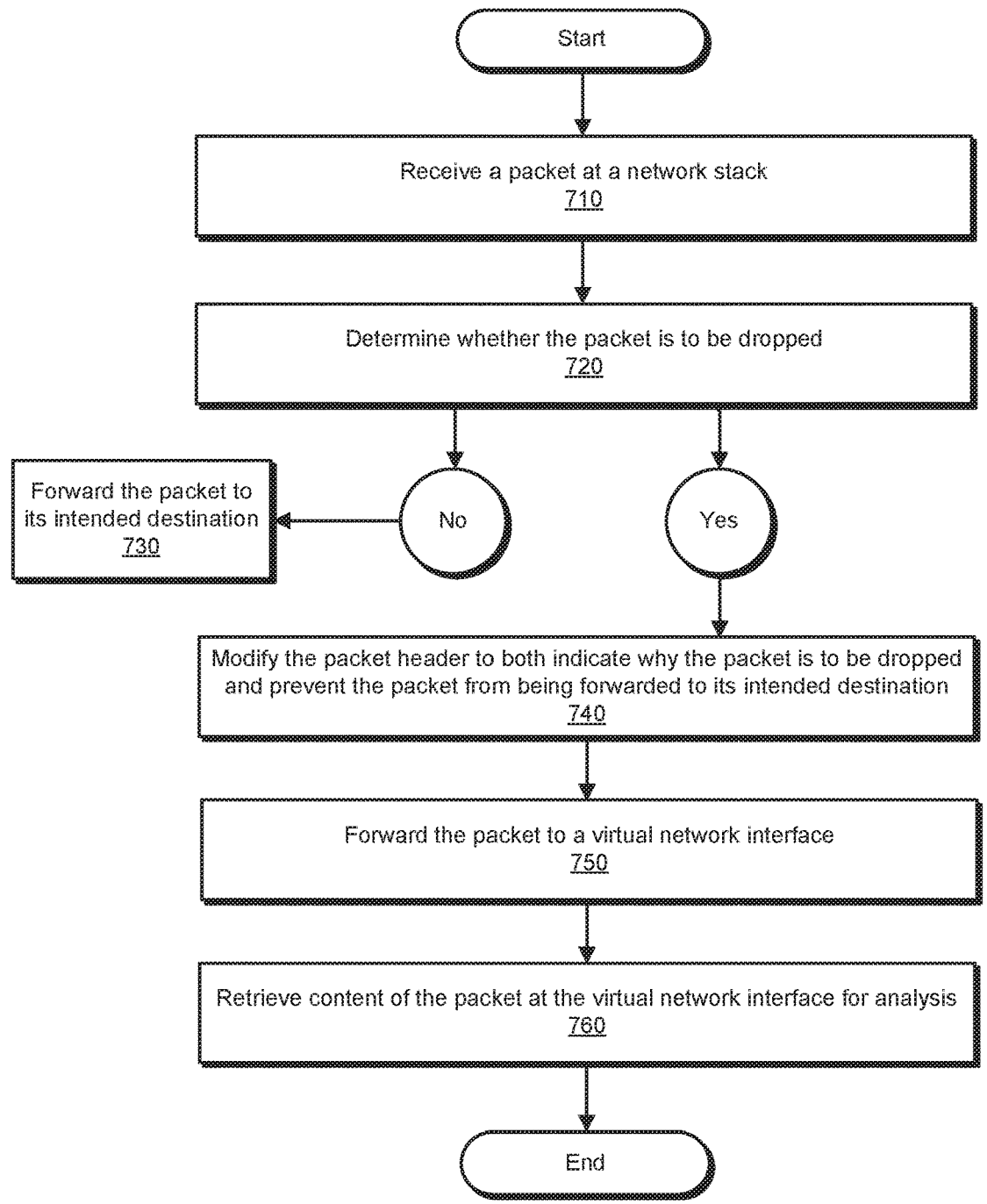
FIG. 7 is a flow diagram of an additional exemplary method for debugging network devices based on the contents of dropped packets.

FIG. 7 illustrates an exemplary method 700 for debugging network devices based on the contents of dropped packets. At step 710 of method 700, a network device (such as network device 202) may receive a packet at a network stack. At step 720, the network device may determine whether the packet is to be dropped. For example, the network device may compare characteristics of the packet with a list of packet filter rules used to identify unwanted and/or potentially harmful packets. Additionally or alternatively, the network device may determine whether the packet contains one or more errors that prevent the packet from being processed or handled by a network interface or other network subsystem. In the event that the network device determines the packet is not to be dropped, method 700 may proceed to step 730. At step 730, the network device may forward the packet to its intended destination. In the event that the network device determines the packet is to be dropped, method 700 may proceed to step 740.

At step 740, the network device may modify a header of the packet to indicate why the packet is to be dropped. For example, the network device may replace the IP identification number of the packet with an error code that describes and/or corresponds to the reason the packet is to be dropped. Also at step 740, the network device may modify the header of the packet to ensure that the network stack is not able to process the packet (e.g., not able to forward the packet to its intended destination). For example, the network device may scramble the IP checksum of the packet.

Next, at step 750, the network device may forward the packet to a virtual network interface within the network device. The disclosed packet analysis systems may have created and/or allocated this virtual network interface specifically to receive and then analyze packets that have been flagged to be dropped. At step 760, the network device may retrieve content of the packet at the virtual network interface. For example, the network device may execute a command that returns the content of all or a portion of the packets at the virtual network interface. By doing so, the network device may efficiently inspect the contents of packets flagged to be dropped by the network device. Based on this inspection, the network device and/or an administrator of the network device may detect and then resolve network issues such as security threats and/or network device malfunctions.

Figure 8:
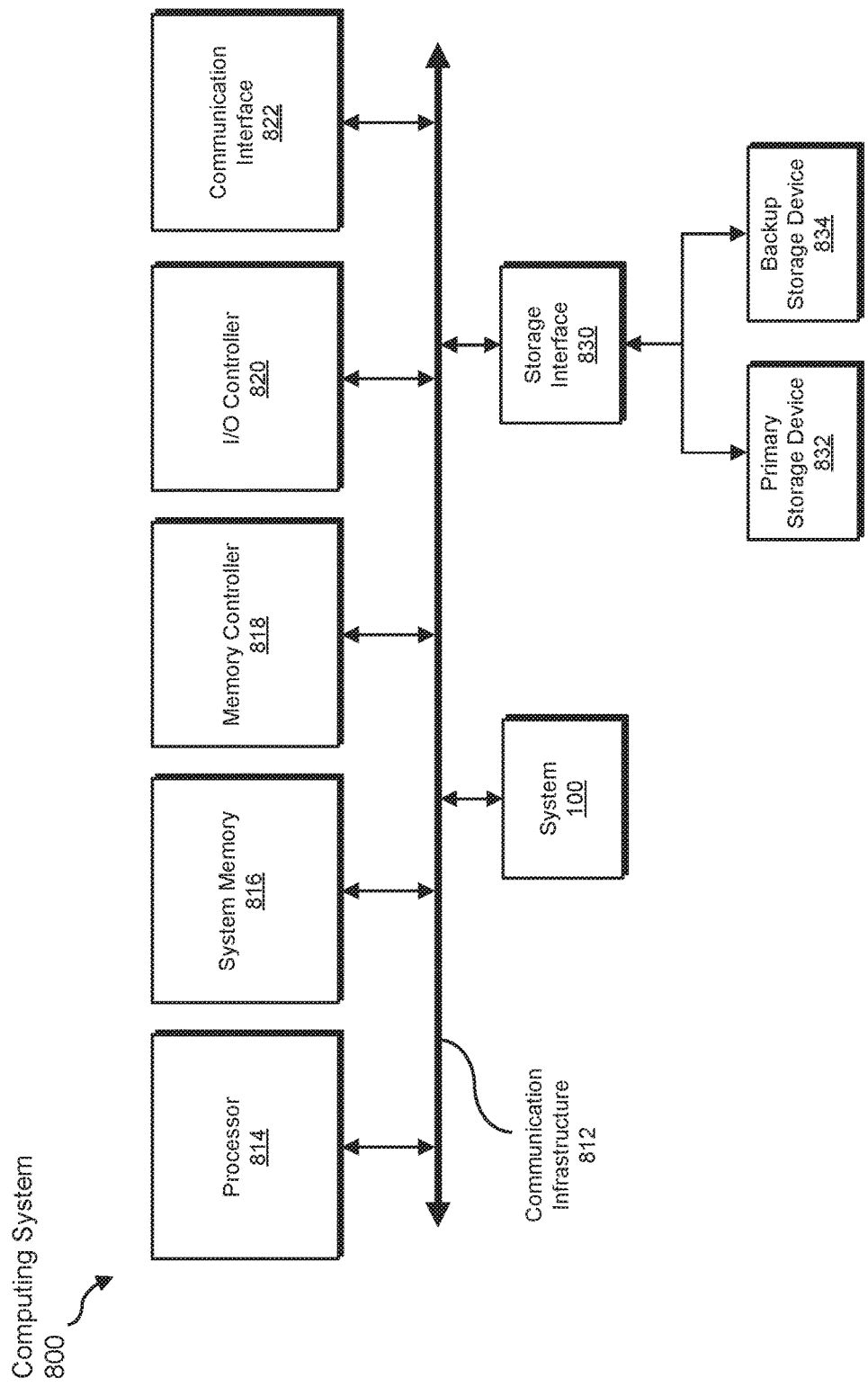
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    detecting, at a network stack of a network device, a packet that:
        is destined at least intermediately for a network interface of the network device; and
        has been flagged by the network stack to be dropped instead of forwarded to the network interface based on at least one characteristic of the packet;
    identifying an Internet Protocol (IP) identification number within a header of the packet;
    instead of dropping the packet:
        replacing, within the header of the packet, the IP identification number with an error code that corresponds to a reason that the packet has been flagged based on the characteristic of the packet;
        altering a checksum field of the packet such that the packet is undeliverable to the network interface; and
        forwarding the packet to an alternative network interface of the network device that analyzes content of packets;
    identifying, at the alternative network interface, the error code that replaced the IP identification number within the header of the packet; and
    executing, based on the error code identified within the header of the packet, at least one action in connection with the packet that improves the performance of the network device.

2. The method of claim 1, further comprising adding, before forwarding the packet to the alternative network interface, an indication of the characteristic of the packet to the packet.

3. The method of claim 2, wherein adding the indication of the characteristic of the packet to the packet comprises:
    selecting, from a set of error codes that describe characteristics of dropped packets, the error code that corresponds to the reason that the packet has been flagged.

4. The method of claim 1, wherein altering the checksum field of the packet comprises scrambling, before forwarding the packet to the alternative network interface, data within the checksum field of the packet such that the network stack is not capable of forwarding the packet to a destination network address listed within the packet.

5. The method of claim 1, further comprising creating the alternative network interface prior to detecting the packet at the network stack.

6. The method of claim 5, wherein creating the alternative network interface comprises creating a virtual network interface dedicated to analyzing packets that have been flagged to be dropped.

7. The method of claim 1, wherein identifying the characteristic of the packet at the alternative network interface comprises executing a command that returns content of at least a portion of packets currently residing at the alternative network interface.

8. The method of claim 1, wherein:
    identifying the characteristic of the packet at the alternative network interface comprises determining that the characteristic of the packet indicates the packet is malicious; and
    executing the action on the packet comprises preventing the packet from compromising the security of the network device due at least in part to the packet being malicious.

9. The method of claim 1, wherein:
    identifying the characteristic of the packet at the alternative network interface comprises determining that the packet contains an error that renders the packet undeliverable to the network interface; and
    executing the action on the packet comprises correcting a network issue that produced the error within the packet.

10. A system comprising:
    a detection module, stored in memory, that:
        detects, at a network stack of a network device, a packet that:
            is destined at least intermediately for a network interface of the network device; and
            has been flagged by the network stack to be dropped instead of forwarded to the network interface based on at least one characteristic of the packet;
        identifies an Internet Protocol (IP) identification number within a header of the packet;
        replaces, within the header of the packet, the IP identification number with an error code that corresponds to a reason that the packet has been flagged based on the characteristic of the packet; and
        alters a checksum field of the packet such that the packet is undeliverable to the network interface; and
    a forwarding module, stored in memory, that instead of dropping the packet, forwards the packet to an alternative network interface of the network device that analyzes content of packets;
    an identification module, stored in memory, that identifies, at the alternative network interface, the error code that replaced the IP identification number within the header of the packet;
    an action module, stored in memory, that executes, based on the error code identified within the header of the packet, at least one action in connection with the packet that improves the performance of the network device; and at least one physical processor configured to execute the detection module, the forwarding module, the identification module, and the action module.

11. The system of claim 10, wherein before the packet is forwarded to the alternative network interface, the detection module adds an indication of the characteristic of the packet to the packet.

12. The system of claim 11, wherein the detection module adds the indication of the characteristic of the packet to the packet by:

selecting, from a set of error codes that describe characteristics of dropped packets, the error code that corresponds to the reason that the packet has been flagged.

13. The system of claim 10, wherein before the packet is forwarded to the alternative network interface, the detection module scrambles data within the checksum field of the packet such that the network stack is not capable of forwarding the packet to a destination network address listed within the packet.

14. The system of claim 10, wherein the forwarding module further creates the alternative network interface prior to detecting the packet at the network stack.

15. The system of claim 14, wherein the forwarding module creates the alternative network interface by creating a virtual network interface dedicated to analyzing packets that have been flagged to be dropped.

16. The system of claim 10, wherein the identification module identifies the characteristic of the packet at the alternative network interface by executing a command that returns content of at least a portion of packets currently residing at the alternative network interface.

17. The system of claim 10, wherein:

the identification module determines that the characteristic of the packet indicates the packet is malicious; and the action module executes the action on the packet by preventing the packet from compromising the security of the network device due at least in part to the packet being malicious.

18. The system of claim 10, wherein:

the identification module determines that the packet contains an error that renders the packet undeliverable to the network interface; and the action module executes the action on the packet comprises correcting a network issue that produced the error within the packet.

19. An apparatus comprising:

at least one storage device that stores rules for identifying packets to be dropped at a network device; and a physical processing device communicatively coupled to the storage device, wherein the physical processing device:

detects, at a network stack of the network device, a packet that:

is destined at least intermediately for a network interface of the network device; and has been flagged by the network stack to be dropped instead of forwarded to the network interface based on at least one characteristic of the packet;

identifies an Internet Protocol (IP) identification number within a header of the packet;

instead of dropping the packet:

replaces, within the header of the packet, the IP identification number with an error code that corresponds to a reason that the packet has been flagged based on the characteristic of the packet;

alters a checksum field of the packet such that the packet is undeliverable to the network interface; and forwards the packet to an alternative network interface of the network device that analyzes content of packets;

identifies, at the alternative network interface, the error code that replaced the IP identification number within the header of the packet; and executes, based on the error code identified within the header of the packet, at least one action in connection with the packet that improves the performance of the network device.

20. The apparatus of claim 19, wherein the physical processing device further adds, before forwarding the packet to the alternative network interface, an indication of the characteristic of the packet to the packet.

* * * * *